United States Patent
Anand et al.

(10) Patent No.: US 10,863,386 B1
(45) Date of Patent: Dec. 8, 2020

(54) STATE MACHINE HANDLING AT A PROXY NODE IN AN ETHERNET-BASED FRONTHAUL NETWORK

(71) Applicant: Cisco Technology, Inc., San Jose, CA (US)

(72) Inventors: Prashant Anand, Bangalore (IN); Manoj Kumar, Karnataka (IN); Sudhir Kayamkulangara, Karnataka (IN); Dinuraj K, Karnataka (IN); Manigandan Boopalan, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/573,162

(22) Filed: Sep. 17, 2019

(51) Int. Cl.
| | |
|---|---|
| *H04W 4/00* | (2018.01) |
| *H04W 28/22* | (2009.01) |
| *H04W 28/04* | (2009.01) |
| *H04W 88/18* | (2009.01) |

(52) U.S. Cl.
CPC ........... *H04W 28/22* (2013.01); *H04W 28/04* (2013.01); *H04W 88/182* (2013.01)

(58) Field of Classification Search
CPC .................................................... H04W 28/22
See application file for complete search history.

(56) References Cited

U.S. PATENT DOCUMENTS

| | | | | |
|---|---|---|---|---|
| 9,313,827 B2* | 4/2016 | Ilyadis | .................. | H04W 28/06 |
| 9,692,514 B2* | 6/2017 | Laraqui | ................. | H04W 24/02 |
| 10,594,423 B1* | 3/2020 | Anand | .................. | H04J 3/0655 |
| 2011/0182255 A1* | 7/2011 | Kim | ..................... | H04W 88/085 |
| | | | | 370/329 |
| 2012/0057572 A1* | 3/2012 | Evans | ................. | H04W 88/085 |
| | | | | 370/338 |

(Continued)

FOREIGN PATENT DOCUMENTS

| | | |
|---|---|---|
| EP | 3468298 A1 | 4/2019 |
| WO | 2018001143 A1 | 1/2018 |

(Continued)

OTHER PUBLICATIONS

3GPP, "3rd Generation Partnership Project; Technical Specification Group Radio Access Network; Evolved Universal Terrestrial Radio Access (E-UTRA); Base Station (BS) radio transmission and reception (Release 16)", 3GPP TS 36.104 V16.2.0, Jun. 2019, 265 pages.

(Continued)

*Primary Examiner* — Guang W Li
(74) *Attorney, Agent, or Firm* — Edell, Shapiro & Finnan, LLC

(57) ABSTRACT

Techniques are described to provide for state machine handling at a proxy node in an Ethernet-based fronthaul network. In one example, a method includes performing, by a proxy node of a fronthaul network, negotiation operations associated with establishing a Common Public Radio Interface (CPRI) communication link between radio devices of the fronthaul network, wherein the negotiation operations comprise Layer 1 synchronization operations and Radio over Ethernet (RoE) validation operations for one or more link bit rates; and facilitating communications between the radio devices at a matching link bit rate upon completion of the negotiation operations.

20 Claims, 8 Drawing Sheets

(56) References Cited

U.S. PATENT DOCUMENTS

| | | | | |
|---|---|---|---|---|
| 2013/0100948 | A1* | 4/2013 | Irvine | H04J 3/0632 370/350 |
| 2014/0198684 | A1 | 7/2014 | Gravely et al. | |
| 2015/0131643 | A1* | 5/2015 | Oren | H04L 69/08 370/338 |
| 2015/0249549 | A1* | 9/2015 | Martinotti | H04L 49/555 370/242 |
| 2016/0087446 | A1* | 3/2016 | Zainaldin | H04L 12/10 307/104 |
| 2016/0277964 | A1* | 9/2016 | Xu | H04W 28/065 |
| 2017/0063491 | A1* | 3/2017 | Bruckman | H04L 7/00 |
| 2017/0324657 | A1* | 11/2017 | Zhong | H04L 1/0086 |
| 2018/0070246 | A1* | 3/2018 | Jack | H04W 24/08 |
| 2018/0310199 | A1* | 10/2018 | Halabian | H04W 28/0289 |

FOREIGN PATENT DOCUMENTS

| | | |
|---|---|---|
| WO | 2018/104175 A1 | 6/2018 |
| WO | 2018103083 A1 | 6/2018 |
| WO | 2018/189726 A1 | 10/2018 |
| WO | 2019/045607 A1 | 3/2019 |

OTHER PUBLICATIONS

Antonio De La Oliva et al., "An overview of the CPRI specification and its application to C-RAN based LTE scenarios", Feb. 2016, 7 pages.

Hardy, Paul, "XCPRI: A Single-Chip CPRI PHY Layer Implemented in the Virtex-II Pro FPGA", May 9, 2007, 27 pages.

IEEE Communication Society, "P1914.3™/D3 Draft Standard for Radio over Ethernet Encapsulations and Mappings", Jan. 2018, 74 pages.

IEEE Communication Society, "P1914.3™/D3.2 Draft Standard for Radio over Ethernet Encapsulations and Mappings", Jun. 2018, 76 pages.

Cho, Peter K. et al., "PoC of Structure agnostic Radio over Ethernet", Apr. 19-21, 2017, 23 pages.

IEEE, "P1914.1/D5.0, Apr. 2019—IEEE Draft Standard for Packet-based Fronthaul Transport Networks", https://ieeexplore.ieee.org/document/8703261, Apr. 25, 2019, 2 pages.

IEEE Communications Society, "P1914.1™/D3.0 Draft Standard for Packet-based Fronthaul Transport Networks", Nov. 2018, 95 pages.

Maiden, Richard, "IEEE1914.3™ Standard for Radio over Ethernet Encapsulations and Mappings", Oct. 25, 2017, 27 pages.

IEEE Communications Society, "IEEE Standard for Radio over Ethernet Encapsulations and Mappings", IEEE Std 1914.3™, Nov. 28, 2018, 77 pages.

Ericsson AB, Huawei Technologies Co. Ltd, NEC Corporation, Alcatel Lucent, and Nokia Networks, "Common Public Radio Interface: eCPRI Interface Specification", eCPRI Specification V2.0, Oct. 5, 2019, 109 pages.

Ericsson AB, Huawei Technologies Co. Ltd, NEC Corporation, Alcatel Lucent, and Nokia Networks, "Common Public Radio Interface: eCPRI Interface Specification", eCPRI Specification V1.2, Jun. 25, 2018, 62 pages.

Ericsson AB, Huawei Technologies Co. Ltd, NEC Corporation, Alcatel Lucent, and Nokia Networks, "Common Public Radio Interface (CPRI); Interface Specification", CPRI Specification V7.0, Sep. 10, 2015, 128 pages.

Texas Instruments, "CPRI Protocol", http://processors.wiki.ti.com/index.php/CPRI_Protocol, Aug. 25, 2009, 6 pages.

Nokia, "Mobile transport convergence using deterministic Time-Sensitive Networks", Nokia White Paper, Document code: SR1910038871EN CID206838, 2019, 11 pages.

International Search Report and Written Opinion in counterpart International Application No. PCT/US2020/015158, dated May 18, 2020, 15 pages.

International Search Report and Written Opinion in counterpart International Application No. PCT/US2020/015156, dated May 4, 2020, 17 pages.

Kevin Bross, "Control Packets for RoE; tf3_1604_bross_control_packets_1", vol. 802.3, retrieved on Apr. 19, 2016, 28 pages.

Ericsson AB, Huawei Technologies Co. Ltd, NEC Corporation, Alcatel Lucent, and Nokia Networks, "Common Public Radio Interface (CPRI); Interface Specification", CPRI Specification V7.0, Oct. 9, 2015, 128 pages.

International Search Report and Written Opinion in counterpart International Application No. PCT/US2020/015157, dated May 20, 2020, 17 pages.

* cited by examiner

STATE MACHINE HANDLING AT A PROXY NODE IN AN ETHERNET-BASED FRONTHAUL NETWORK

TECHNICAL FIELD

The present disclosure relates to network equipment and services.

BACKGROUND

Mobile networking architectures have grown increasingly complex in communication environments. In particular, access network configurations for mobile networking architectures have become more complex. As access network configurations become more complex, facilitating communications among access network elements such as a radio equipment controller and radio equipment becomes more critical. Accordingly, there are significant challenges in facilitating communications between a radio equipment controller and radio equipment in a network.

DESCRIPTION OF EXAMPLE EMBODIMENTS

Overview

Figure 1:
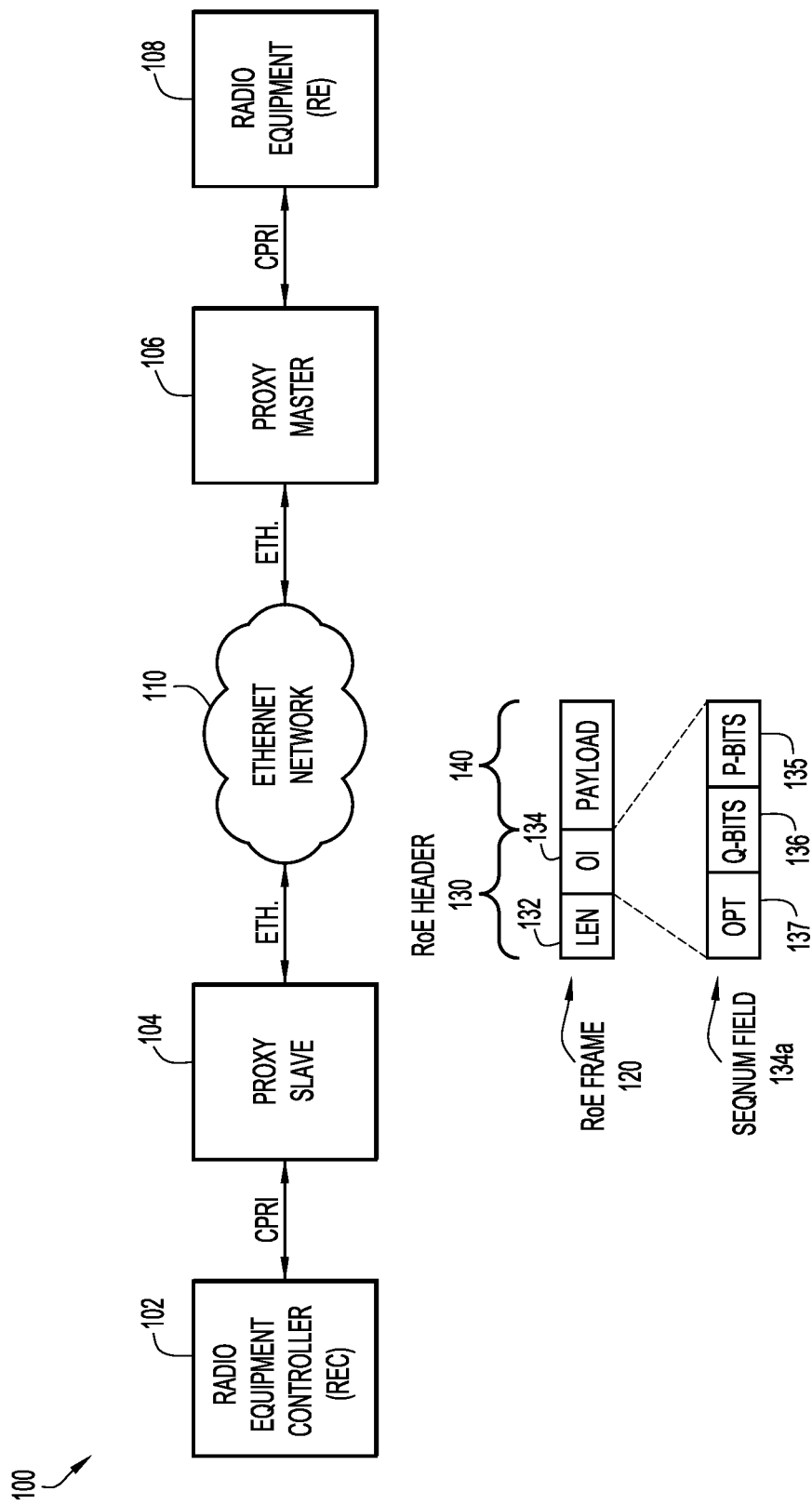
FIG. 1 is a block diagram of an Ethernet-based fronthaul network in which techniques for providing state machine handling at a proxy node may be implemented, according to an example embodiment.

Techniques presented herein provide for the ability to use proxy nodes in an Ethernet-based fronthaul network to facilitate end-to-end Common Public Radio Interface (CPRI) communications between a radio equipment controller (REC) and a radio equipment (RE). In at least one embodiment, techniques presented herein may provide for the identification of different states of a proxy node state machine as may be applicable for Layer 1 (L1) gateway or proxy nodes in an Ethernet-based fronthaul network, which may include identification of various events for state transitions along with a deterministic method to conclude on certain events that may occur during Layer 1 synchronization operations. Techniques presented herein may further provide for a proxy node to declare that a Radio over Ethernet (RoE) end unit L1 synchronization has been achieved based on analysis of frame length and p/q counter values in successive RoE frames.

In an example embodiment, a method is provided and may include performing, by a proxy node of a fronthaul network, negotiation operations associated with establishing a Common Public Radio Interface (CPRI) communication link between radio devices of the fronthaul network, wherein the negotiation operations comprise Layer 1 synchronization operations and Radio over Ethernet (RoE) validation operations for one or more link bit rates; and facilitating communications between the radio devices at a matching link bit rate upon completion of the negotiation operations.

Example Embodiments

The following foundational information may be viewed as a basis from which the present disclosure may be properly explained. Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet or frame is a formatted unit of data that can contain control or routing information (e.g., source and destination address, source and destination port, etc.) and data, which is also sometimes referred to as a payload or data payload. In some embodiments, control or routing information, management information, or the like can be included in packet or frame fields, such as within header(s) and/or trailer(s).

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

In general, Common Public Radio Interface (CPRI) is a point-to-point Layer 1 (L1) technology that is based on a constant bit rate, always-ON bit-stream concept. In a traditional CPRI-based deployment, a radio equipment controller (REC) and a radio equipment (RE) follow the CPRI Specification and perform operations of a CPRI Master and a CPRI Slave, respectively.

Both the REC and RE are two basic building blocks of a radio base station. The REC generally operates to provide Network Interface transport, radio base station control and management, as well as digital baseband processing, whereas the RE provides the analog and radio frequency functions via a radio head such as filtering, modulation, frequency conversion and amplification or, more generally, RE serves as the air interface to one or more user equipment (UE). In some instances, a REC may also be referred to as a baseband unit (BBU). In some instances, a RE may also be referred to as a remote radio head (RRH).

Typically for a traditional CPRI-based deployment, the REC and RE are directly connected by a fiber cable. However, in some current fronthaul networks the REC and RE do not interact directly as the direct fiber connection can be replaced with an Ethernet network between the REC and RE. Hence, there may be intermediate nodes in this Ethernet network, which may act as proxy nodes for the REC and RE while interacting with the real or actual CPRI end points (e.g., the REC and RE may be considered the actual CPRI end points).

For an Ethernet-based fronthaul network, the point-to-point CPRI link is no longer a direct point-to-point link; rather, CPRI is terminated twice in the path between the REC and the RE. For example, a CPRI bit stream can be mapped to Ethernet-based Radio over Ethernet (RoE) frames and carried over the Ethernet network towards the other end of fronthaul network where the CPRI bit stream is played out (e.g., transmitted) again towards a CPRI end point after extracting the CPRI bit stream from the RoE frames.

However, end-to-end communications between an REC and RE involves following the CPRI protocol specification such is defined, for example, by the CPRI version 7.0 (v7.0) Specification. Thus, the end-to-end CPRI in an Ethernet-based fronthaul network is actually a cross product of CPRI and the Ethernet paths where these gateway (GW) or proxy nodes may provide RoE mapper/de-mapper operations and may also allow end-to-end CPRI protocol operations to be performed in an Ethernet-based fronthaul network. Although the CPRI v7.0 Specification is referred to herein, it is to be understood that CPRI-based operations as described herein may be performed to any CPRI-based Specification.

The Institute of Electrical and Electronics Engineers (IEEE) 1914.3 Specification describes methods to map a CPRI bit stream into RoE frames and vice-versa to de-map RoE frames into a CPRI bit stream. Using structure agnostic and/or structure aware modes as defined by the IEEE 1914.3 Specification allows a L1 gateway or proxy node to map CPRI In-phase and Quadrature (I/Q) radio data and/or control data as may be received from a CPRI end point (e.g., REC or RE) into RoE frames and to de-map CPRI I/Q and/or control data from the RoE frames into a CPRI bit stream. Such mapping/de-mapping operations can be used by the proxy nodes to facilitate end-to-end CPRI flows between an REC and RE. Additionally, these CPRI interfacing Ethernet nodes are to participate in operations involving a CPRI state machine as defined in the CPRI v7.0 Specification, as well as remain passive to the majority of end-to-end higher layer protocol communications between the REC and RE.

The CPRI v7.0 Specification describes a complete CPRI state machine for the CPRI end points; however, this standards-based CPRI state machine is not directly applicable for proxy nodes in an Ethernet-based fronthaul network especially when the structure agnostic RoE mapping method is used for mapping CPRI to RoE frames. The CPRI v7.0 Specification CPRI state machine described for the CPRI end points is not directly applicable for the proxy or CPRI gateway nodes of an Ethernet-based fronthaul network for various reasons.

First, these proxy nodes are not actively involved in participating in the higher layer (e.g., Layer 2+) protocol setups beyond Layer 1 synchronization, which includes hyper-frame structure alignment. Rather, these higher layer protocol negotiations only occur between the CPRI end points (e.g., REC and RE). Second, the CPRI v7.0 Specification also involves vendor specific negotiations which can vary from vendor to vendor. Since proxy nodes of an Ethernet-based fronthaul network may not be specific to some REC or RE vendors, the proxy nodes may not take an active part in such negotiations while allowing these negotiations to take place directly between an REC and RE.

For the CPRI v7.0 Specification, certain states for the CPRI state machine involving Protocol setup (State C of the CPRI state machine), control and management (C/M or C&M) Layer 2+ setup (State D of the CPRI state machine), Interface and vendor specific negotiations (State E of the CPRI state machine), and Passive link (State G of the CPRI state machine) states are not applicable to CPRI L1 gateway or proxy nodes as may be used in an Ethernet-based fronthaul network. Rather, operations of the proxy nodes may involve passively allowing the protocol negotiations in these states between the CPRI end points. Additionally, the proxy nodes may handle alarm conditions from the CPRI end points as well as from the RoE end points (e.g., as may be detected by a proxy node) during the L1 synchronization state, which are conditions that may specific be to the L1 gateway or proxy nodes.

Additionally, there is no prior explicit description of the nomenclature and/or identification of actions of the proxy nodes as per the IEEE 1914.3 Specification. For example, an explicit specification or description of these proxy nodes and their actions during the lifetime of a CPRI-RoE flow are not covered in the IEEE 1914.3 specification. The IEEE 1914.3 Specification also does not cover state machine aspects for these nodes, how these nodes may facilitate the initial L1 synchronization up-to an operational stage, handle CPRI alarms, and/or how these proxy nodes may handle errors and/or faults with respect to CPRI and/or RoE end points or that may be raised internally raised during the course of a CPRI flow.

Techniques presented herein may provide: a nomenclature for proxy nodes of an Ethernet-based fronthaul network; various actions and/or operations of such proxy nodes for various state machine aspects of such proxy nodes (e.g., a set of states and state transitions); and a broad-level approach to enable the cross product of CPRI and Ethernet to be achieved in order to facilitate end-to-end CPRI flows between an REC and RE in the Ethernet-based fronthaul network. In addition, techniques presented herein may provide for the ability of proxy nodes to handle various error or non-error events that may span or otherwise cover initial CPRI Layer 1 synchronization operations to an operational stage in which a CPRI bit stream can flow successfully end-to-end between an REC and an RE.

Referring to FIG. 1, FIG. 1 is a block diagram of an Ethernet-based fronthaul network 100 in which techniques for providing state machine handling at a proxy node may be implemented, according to an example embodiment. As referred to herein for an Ethernet-based fronthaul network (e.g., Ethernet-based fronthaul network 100), a proxy node acting as a radio equipment (RE) while interacting with a radio equipment controller (REC) is termed a 'Proxy Slave' node and a proxy node acting as a REC while interacting with a RE is termed a 'Proxy Master' node.

Ethernet-based fronthaul network 100 includes a REC 102, a Proxy Slave node 104, a Proxy Master node 106, and a RE 108. Ethernet-based fronthaul network 100 may also include an Ethernet network 110. Also shown in FIG. 1 is an example RoE frame 120, which is discussed in further detail below.

The Proxy Slave and the Proxy Master may be referred to, generally, as proxy nodes. In at least one embodiment, these proxy nodes may be considered Ethernet nodes having capabilities to perform CPRI interactions with the REC/RE.

These proxy nodes may also perform operations to map a CPRI bit stream to RoE frames and operations to de-map RoE frames to a CPRI bit stream before playing out the CPRI bit stream towards the real/actual CPRI end points (e.g., REC or RE). Stated differently, these proxy nodes may act as CPRI L1 gateways in Ethernet-based fronthaul network 100.

Thus, in at least one embodiment, at least one CPRI interface element or port may be configured for each of Proxy Slave 104 and Proxy Master 106. In at least one embodiment, at least one Ethernet interface element or port may also be configured for each of Proxy Slave 104 and Proxy Master 106 to facilitate communications via Ethernet network 110. As illustrated in FIG. 1, the interconnection between REC 102 and Proxy Slave 104 is a CPRI interconnection, the interconnection between Proxy Slave 104 and Ethernet network 110 is an Ethernet interconnection, the interconnection between RE 108 and Proxy Master 106 is a CPRI interconnection, and the interconnection between Proxy Master 106 and Ethernet network 110 is an Ethernet interconnection.

In general, RoE frames, such as RoE frame 120 may include a RoE header 130 and a RoE payload 140. The RoE header 130 may include various fields including, but not limited to, a length (LEN) field 132 and an Ordering Information (orderInfo or OI) field 134. Although not shown, RoE header may also include a subType field and a flow identifier (ID) field. Length field 132 may be set to a value based on the RoE payload 140 size. The RoE payload 140 may include packetized radio data (e.g., a CPRI bit stream) and/or control information mapped therein. It is to be understood that RoE frame 120 may be encapsulated in an Ethernet frame.

According to the IEEE 1914 Specification, the orderInfo field 134 is a 32-bit field that can be configured to include sequence number information or timestamp information carried with each RoE frame 120. In general, the sequence number information can be used to identify the order of successive packets. For sequence number information contained in RoE header 130, orderInfo field 134 is configured as a 32-bit sequence number (seqNum) field 134a. The seqNum field 134a includes a p-counter field 135 having a number of p-bits that can be used to indicate a p-counter value, a q-counter field 136 having number of q-bits that can be used to indicate a q-counter value, and an optional reserved bits field 137. The contents of the p-counter field 135 and the q-counter field 136 are specified by the IEEE 1914.3 Specification.

During operation, p-counter values contained in the p-counter field 135 and q-counter values contained in the q-counter field 136 may be incremented depending on the number of bytes included in each RoE frame 120 communicated from one RoE endpoint (e.g., Proxy Master or Proxy Slave) to the other RoE endpoint As discussed in further detail herein, an increment value may be identified and tracked for each of the p/q-counter values and the frame length may be tracked for successive RoE frames received by a proxy node in order to identify various events/conditions, which may trigger one or more corresponding operations and/or state transitions by the proxy node, as discussed in further detail herein, below.

Although not shown, REC 102 may further interface or otherwise communicate with a Third (3rd) Generation Partnership Project (3GPP) mobile core network (not shown), such as any combination of a 3GPP Fourth Generation (4G)/Long Term Evolution (LTE) mobile core network and/or a Fifth Generation (5G) mobile core network. Further, RE 108 may further interface or otherwise communicate with one or more user equipment (UE) via over-the-air Radio Frequency (RF) communications. In some instances, REC 102 may be referred to as a 'CPRI Master' and RE 108 may be referred to as a 'CPRI slave'.

As discussed in further detail with reference to FIGS. 2-7, various L1 synchronization operations, also referred to an auto-negotiation procedure, may be performed within Ethernet-based fronthaul network to facilitate CPRI link establishment between REC 102 and RE 108 at a common matching link bit rate via Proxy Slave 104 and Proxy Master 106. In at least one embodiment, L1 synchronization operations facilitated via proxy nodes such as Proxy Slave 104 and Proxy Master 106 may be performed according to a proxy node state machine, as illustrated in FIG. 2.

Figure 2:
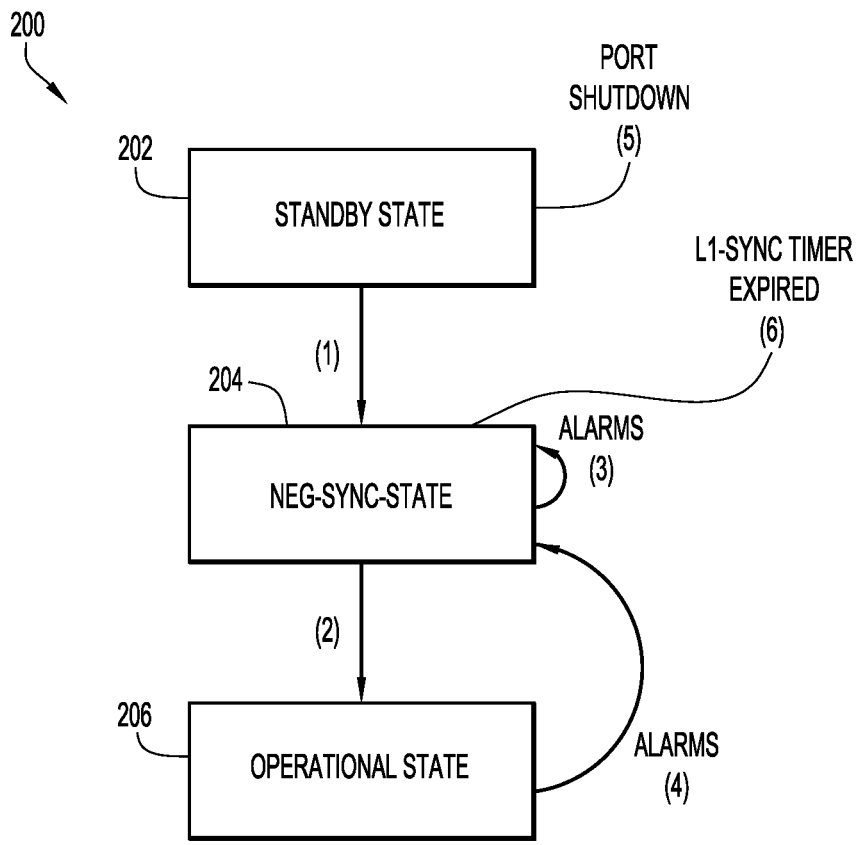
FIG. 2 is a block diagram illustrating a proxy node state machine that may facilitate operations of a proxy node according to an example embodiment.

Referring to FIG. 2, FIG. 2 is a block diagram illustrating a proxy node state machine 200 that may facilitate operations of a proxy node, according to an example embodiment. Reference is also made to FIG. 1 in connection with the description of FIG. 2. In at least one embodiment, the proxy node state machine may include an Idle or Standby state 202, a Negotiation Synchronization State (Neg-Sync-State) 204, and an Operational state 206. For FIG. 2, a proxy node may be either Proxy Slave 104 or Proxy Master 106.

In the Standby state 202, a proxy node, whether it is the Proxy Master or Proxy Slave, does not transmit or receive a CPRI bit stream or RoE frames. Rather, the proxy node is waiting to be configured to start various CPRI and RoE functions/operations.

In at least one embodiment, a CPRI line rate or link bit rate list (e.g., including at least 4 link bit rates) may be configured (e.g., manually by a user/operator and/or automatically via a script, etc.) as a start-up configuration for the proxy node while in the Standby state 202. In addition, a corresponding role of the proxy node as to whether the proxy node is to perform operations associated with a Proxy Slave or a Proxy Master (e.g., depending on where the node is positioned in a fronthaul network) may also be configured for the proxy node in the Standby state 202. As referred to herein, the terms 'line rate', 'link rate', and 'link bit rate' can be used interchangeably.

On receiving a trigger (e.g., manually from a user/operator, automatically following power-on/reset, or the like) to start the CPRI port operations for the proxy node, the proxy node transitions to the Neg-Sync-State 204. The proxy node also initiates a L1 synchronization top level timer (L1-sync timer) before or upon transitioning to the Neg-Sync-State 204. The L1-sync timer may be used as a watchdog timer for the end-to-end L1 synchronization in Ethernet-based fronthaul network such that, upon expiration of the timer without the L1 synchronization being achieved, the proxy node may re-start operations for the Neg-Sync-State and may restart the timer to re-attempt the end-to-end link auto-negotiation procedure.

In the Neg-Sync-State, the proxy node may perform negotiation operations associated with establishing a CPRI communication link between radio devices (e.g., REC 102 and RE 108) of the Ethernet-based fronthaul network 100 in which the negotiation operations may include sub-state operations including L1 synchronization operations and RoE validation operations for one or more link bit rates. Additional details associated with the Neg-Sync-State that are specific to each of the respective Proxy Slave 104 and Proxy Master 106 are discussed herein with reference to FIGS. 4-5, for Proxy Slave 104, and FIGS. 6-7, for Proxy Master 106.

Upon successful completion of the negotiation operations in the Neg-Sync-State, the proxy node may transition to the Operational state 206. For the Operational state 206, the proxy node may perform mapping/de-mapping operations to facilitate end-to-end communications between the radio devices (e.g., REC and RE) at a matching link bit rate, which can be used to facilitate C&M L2+ operations between the radio devices as well as normal operations involving CPRI transmission/reception operations between the radio devices. In the Operational state 206, the proxy node may also monitor, detect, and/or receive any CPRI alarm (e.g., Loss of Sync (LOS), Loss of Frame (LOF), and/or remote alarm indication (RAI)), which may cause the proxy node to transition back to the Neg-Sync-State 204, to reset the L1-sync timer, and to restart the negotiation operations.

In some embodiments for the Operational state, the proxy node may monitor and detect persistent changes in RoE frame length and/or p/q counter increment values, upon which detection may cause the proxy node to transition back to the Neg-Sync-State 204, to reset the L1-sync timer, and restart the negotiation operations. Additional details associated with the Operational state 206 that are specific to each of the respective Proxy Slave 104 and Proxy Master 106 are discussed herein with reference to FIGS. 4-5, for Proxy Slave 104, and FIGS. 6-7, for Proxy Master 106.

In general, state transitions for the proxy node state machine 200 as illustrated in FIG. 2 may be performed as follows:

(1) Trigger (e.g., manual or automatic) to start CPRI/RoE functionality to transition to the Neg-Sync-State 204.

(2) Neg-Sync-State 204 negotiation operations are successfully achieved to transition to Operational state 206. For this transition, a local end CPRI L1 synchronization is achieved (e.g., K-byte alignment detection in received CPRI stream) and persistent successful reception of RoE frames from the far-end opposite proxy node is achieved. For achieving persistent successful reception of RoE frames (also referred to herein as RoE validation operations), frame length and p/q-counter increment values in an upstream direction are considered to be in sync with a downstream direction data rate and no alarm(s) are to be seen (e.g., detected and/or received) on the CPRI end point and RoE end point. In at least one embodiment, persistent successful reception may considered to be achieved after a successful match of consistent frame length and p/q-counter increment values is found for a duration of 10 complete hyper-frames.

(3) Any of the CPRI or RoE alarms persist triggers a re-start to the Neg-Sync-State 204 operations. The CPRI or RoE alarms may include:
  i. CPRI LOS/LOF/RAI alarm
  ii. ROE reported alarm—on detection of CPRI alarm by the other end of the fronthaul
  iii. Persistent change in RoE frame length/counter increment values detected (4) Any of the CPRI or RoE alarms persist triggers a transition back to the Neg-Sync-State 204 and re-start the Neg-Sync-State 204 operations. The CPRI or RoE alarms may include:
  i. CPRI LOS/LOF/RAI alarm
  ii. ROE reported alarm—on detection of CPRI alarm by the other end of the fronthaul
  iii. Persistent change in RoE frame length/counter increment values detected (5) Port is shutdown to transition back to the Standby state 202.

(6) L1-sync top level timer expired in Neg-Sync-State 204 or Operational state 206, which triggers a transition to and/or re-start of the Neg-Sync-State 204 operations (e.g., re-starting the L1 synchronization operations after re-starting the L1-sync top level timer).

Figure 3:
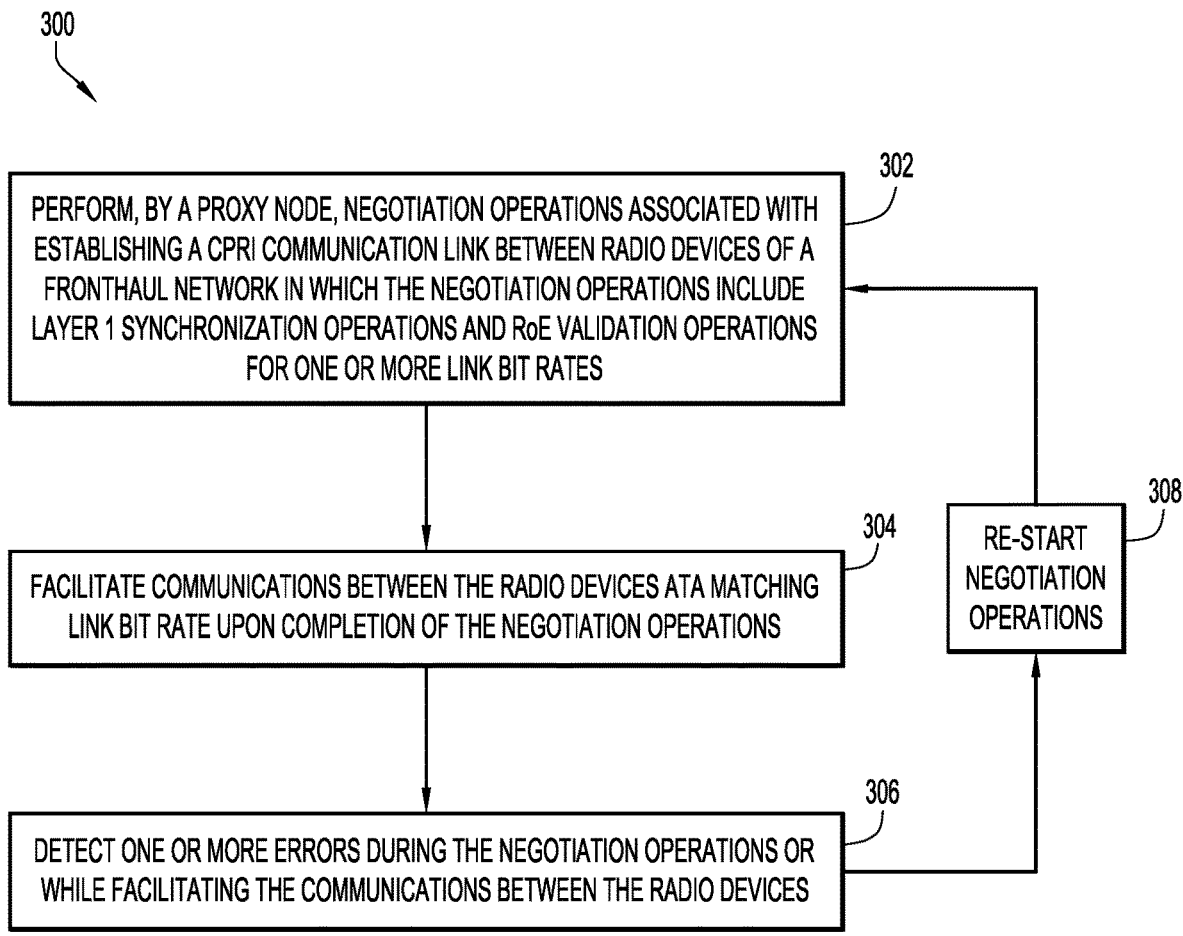
FIG. 3 is a flow chart depicting a method according to an example embodiment.

Referring to FIG. 3, FIG. 3 is a flow chart depicting a method 300 according to an example embodiment. In at least one embodiment, operations associated with method 300 may be performed by a proxy node in an Ethernet-based fronthaul network, such as Proxy Slave 104 or Proxy Master 106 in Ethernet-based fronthaul network 100.

At 302, the method may include performing, by the proxy node, negotiation operations associated with establishing a Common Public Radio Interface (CPRI) communication link between radio devices of a fronthaul network (e.g., Ethernet-based fronthaul network 100) in which the negotiation operations comprise Layer 1 synchronization operations and RoE validation operations for one or more link bit rates. At 304, the method may include facilitating communications between the radio devices at a matching link bit rate upon completion of the negotiation operations.

At 306, the method may further include detecting, by the proxy node, detecting one or more errors during the negotiation operations or while facilitating the communications between the radio devices at 306 and re-starting the negotiation operations based on the one or more errors, as shown at 308. In various embodiments, the one or more errors can include a Loss of Synchronization (LOS) alarm; a Loss of Frame alarm; a remote alarm indication (RAI); a RoE fault determined based on RoE frames transmitted and/or received by the proxy node; and a timeout of a L1-sync timer. In at least one embodiment, at 308, the operations may include re-starting the L1-sync timer before beginning the negotiation operations at 306. In various instances, the one or more errors may include at least one of: one or more errors detected by the proxy node; and one or more errors indicated in RoE frames received by the proxy node.

In at least one embodiment, the RoE validation operations performed by the proxy node at 302 may include determining a consistency in RoE frame length and packet counter increment values for one of: a plurality of RoE frames received by the proxy node; and a plurality of RoE frames both transmitted and received by the proxy node. In at least one embodiment, the Layer 1 synchronization operations performed by the proxy node at 302 may include attempting a hyper-frame number synchronization for a CPRI bit stream output by a first radio device (e.g., as may be performed by the Proxy Slave 104, discussed in further detail below); and upon achieving the hyper-frame number synchronization for the CPRI bit stream at a particular link bit rate in use during the Layer 1 synchronization operations, transmitting the CPRI bit stream toward a second radio device via a plurality of RoE frames in which each transmitted RoE frame indicates a frame length and a counter value that is set based on the particular link bit rate.

Figure 4:
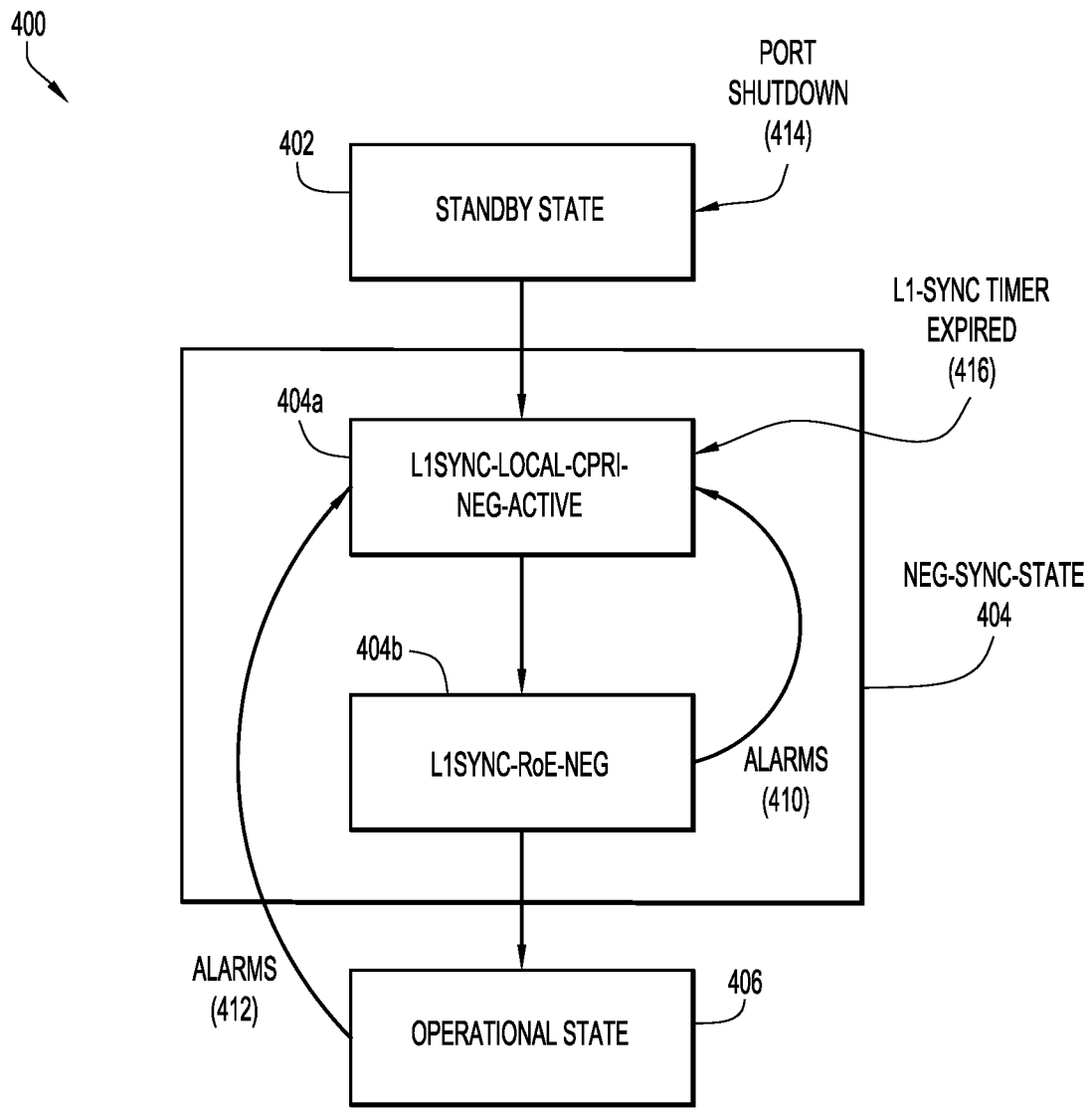
FIG. 4 is a block diagram illustrating a configuration of the proxy node state machine of FIG. 2 as configured for a Proxy Slave node in an Ethernet-based fronthaul network via a Proxy Slave state machine, according to an example embodiment.

Referring to FIG. 4, FIG. 4 is a block diagram illustrating a configuration of the proxy node state machine of FIG. 2 as configured for a Proxy Slave node in an Ethernet-based fronthaul network (e.g., Proxy Slave node 104 in Ethernet-based fronthaul network 100) via a Proxy Slave state machine 400, according to an example embodiment. In at least one embodiment, the Proxy Slave state machine 400 may include a Standby state 402, a Neg-Sync-State 404, and an Operational state 406. For the embodiment of FIG. 4, the Neg-Sync-State 404 may include a Layer 1 Synchronization Local CPRI Negotiations Active (L1Sync-Local-CPRI-Neg-Active) sub-state 404a and may also include a Layer 1 Synchronization RoE Negotiation (L1Sync-RoE-Neg) sub-state 404b.

In the Standby state 402, the Proxy Slave node does not transmit or receive a CPRI bit stream or RoE frames but instead awaits configuration to start various CPRI and RoE functions/operations. In at least one embodiment, a CPRI link bit rate list (e.g., including at least 4 link bit rates) may be configured by for the Proxy Slave node (e.g., manually by a user/operator and/or automatically via a script, etc.) as start-up configuration for the Proxy Slave node while in the Standby state 402. In addition, a corresponding role of being a Proxy Slave node may also be configured for the Proxy Slave node in the Standby state 402.

Upon successful configuration of the Proxy Slave node in the Standby state 402, the Proxy Slave node transitions to the Neg-Sync-State 404 of the Proxy Slave state machine and, in particular, transitions to the L1Sync-Local-CPRI-Neg-Active sub-state 404a of the Neg-Sync-State 404.

In the L1Sync-Local-CPRI-Neg-Active sub-state 404a, the Proxy Slave engages in CPRI L1 synchronization operations (e.g., the auto-negotiation procedure) with the REC such that the Proxy Slave emulates actions of an actual CPRI Slave node (e.g., the RE) and attempts to decode the REC transmitted CPRI bit stream to attempt to achieve byte alignment and frame alignment. During the operations for the auto-negotiation procedure, the REC changes its transmit CPRI rates after every 0.9-1.1 second interval (as per the procedure described in the CPRI v7.0 Specification or any other CPRI-related Specification).

On achieving a hyper-frame number synchronization (HFNSYNC) with the REC transmission, the Proxy Slave will begin to map the received CPRI bit stream (from the REC) in RoE frames and transmit the RoE frames towards the far end of the Ethernet-based fronthaul network (e.g., towards the Proxy Master). The Proxy Slave does not try to play back a CPRI bit stream towards the REC in the L1Sync-Local-CPRI-Neg-Active sub-state 404a as this play out is to be performed only for the CPRI bit stream received from CPRI Slave end point (e.g., RE).

On achieving HFNSYNC with the REC transmission and starting the RoE transmission towards the Proxy Master, the Proxy Slave transitions to the L1Sync-RoE-Neg sub-state 404b of the Proxy Slave state machine 400.

In the L1Sync-Local-CPRI-Neg-Active sub-state 404a, the Proxy Slave is not receiving any RoE frames from the Proxy Master; hence detection of RoE faults is not applicable in this sub-state. However, the Proxy Slave may detect the CPRI faults in this sub-state which will trigger restart of the CPRI L1 synchronization with the REC after restarting the L1-sync top level timer.

For the L1Sync-RoE-Neg sub-state 404b, the Proxy Slave performs, among other operations, various RoE frame validation operations. For example, the Proxy Slave continues to map the CPRI bit steam into RoE frames and transmits the RoE frames towards the Proxy Master until the Proxy Slave is also able to detect an RoE end point Layer 1 synchronization in the RoE frames received from Proxy Master, meaning that the Proxy Master has achieved a HFNSYNC for a CPRI bit stream transmitted by the RE to the Proxy Master).

For the L1Sync-RoE-Neg sub-state 404b, the Proxy Slave performs RoE frame validation operations by continuously checking the RoE frame length and p/q-counter increment values in the received RoE frames against values in use in the reverse (e.g., transmission) direction where it is performing the CPRI to RoE frame mapping and transmissions toward the Proxy Master.

When both the received and transmitted frames match for at least 10 successive CPRI hyper-frames, the RoE end point L1 synchronization (e.g., for the Proxy Master) is declared to be achieved, and the Proxy Slave can assume or infer that the Proxy Master and the RE are aligned with Proxy Slave and all that nodes are using a same matching CPRI link rate. Upon determining matching frame lengths and p/q-counter increment values for transmitted and received RoE frames for at least ten (10) successive CPRI hyper-frames, the Proxy Slave node transitions to the Operational state 406 of the Proxy Slave state machine 400.

The determination of matching frame lengths and p/q-counter increment values and transition to the Operational state 406 is an important event in operation of the Proxy Slave state machine 400 and ensures that only the REC side HFNSYNC is pending, which is transparent to the Proxy Slave from the L1Sync-RoE-Neg sub-state 404b onwards.

In at least one embodiment, the number of 10 successive CPRI hyper-frames (which is less than a millisecond) may be used to ensure sufficient time before the Proxy Slave infers that the Proxy Master and the RE are aligned with the Proxy Slave at a matching link bit rate; however, other numbers of successive CPRI hyper-frames may be configured.

For the L1Sync-RoE-Neg sub-state 404b, if any CPRI alarm (e.g., LOS, LOF, and/or RAI) is detected by the Proxy Slave or if the Proxy Slave receives an CPRI alarm in the RoE frames from the Proxy Master (e.g., due to proxy master detecting an CPRI alarm on its CPRI link with RE) as shown at 410; the Proxy Slave restarts the L1-sync top level timer and restarts the CPRI-RoE negotiation by transitioning back to the L1Sync-Local-CPRI-Neg-Active sub-state 404a to restart the auto-negotiation procedure again.

In the Operational state 406, an end-to-end CPRI and RoE (CPRI-RoE) flow is considered to be up and operational from the Proxy Slave's perspective such that the Proxy Slave starts playing out the CPRI bit stream toward the REC from the RoE frames received from the Proxy Master. The REC will attempt to receive and decode the CPRI bit stream as per the procedure prescribed by the CPRI v7.0 Specification (or any other CPRI-related Specification). If the REC is using the same link bit rate as Proxy Slave and other nodes at this stage as per the Layer 1 synchronization procedure, the REC will be able to achieve HFNSYNC with the received CPRI bit stream. On achieving the HFNSYNC, the REC is able to correctly decode the CPRI stream transmitted by the RE while the RE was already decoding the CPRI transmitted by the REC.

After achieving the HFNSYNC, the REC will start the C&M, Layer 2 and higher Layer negotiations with the RE. The Proxy Slave does not have any active role to play in these negotiations other than performing the mapping and de-mapping operations of mapping the CPRI bit stream received from the REC to RoE frame transmitted toward the Proxy Master and de-mapping RoE frames received from the Proxy Master to a CPRI stream transmitted to the REC.

In case any CPRI alarm (LOS/LOF/RAI) is detected by the Proxy Slave in the Operational state 406 as shown at 412, the Proxy Slave transitions back to the L1Sync-Local-CPRI-Neg-Active sub-state 404a and restarts the CPRI-RoE operations. Similarly, if the Proxy Slave receives a CPRI alarm in any RoE frames received from the Proxy Master (e.g., due to proxy master detecting a CPRI alarm on its CPRI link with RE), it transitions back to the L1Sync-Local-CPRI-Neg-Active sub-state 404a and restarts the CPRI-RoE operations. During or upon moving to the L1Sync-Local-CPRI-Neg-Active sub-state 404a, the L1-sync top level timer is also restarted by the Proxy Slave. In the event of a port shutdown as shown at 414, the Proxy Slave may revert back to the Standby state 402 and await configuration, as discussed herein. In the event of a timeout of the L1-sync timer as shown at 416, the Proxy Slave may transition back to the L1Sync-Local-CPRI-Neg-Active sub-state 404a and restart the CPRI-RoE operations after restarting the L1-sync timer.

Figure 5:
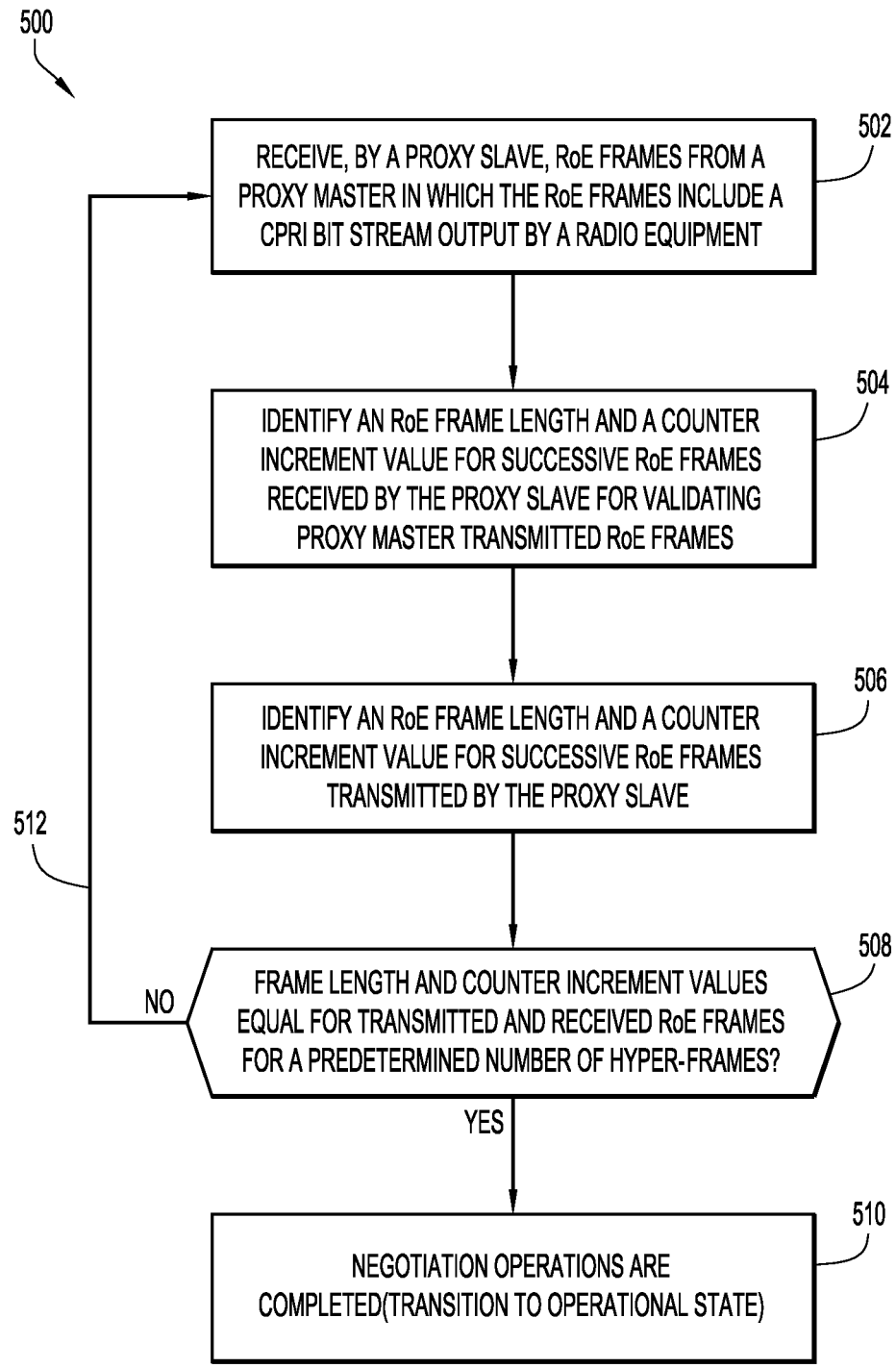
FIG. 5 is another flow chart depicting another method according to an example embodiment.

Referring to FIG. 5, FIG. 5 is a flow chart depicting another method 500 according to an example embodiment. In at least one embodiment, operations associated with method 500 may be associated with RoE validation operations that may be performed by a Proxy Slave in an Ethernet-based fronthaul network (e.g., Proxy Slave 104 in Ethernet-Based fronthaul network 100).

At 502, the method may include receiving, by the Proxy Slave, RoE frames from a Proxy Master in which the received RoE frames include a CPRI bit stream output by a radio equipment. At 504, the Proxy Slave identifies a RoE frame length and a counter increment value for successive RoE frames received by the Proxy Slave (e.g., from the Proxy Master) for validating the Proxy Master transmitted RoE frames. At 506, the Proxy Slave identifies a RoE frame length and a counter increment value (e.g., a p/q-counter increment value) for successive transmitted RoE frames transmitted by the Proxy Slave.

At 508, the Proxy Slave determines whether the RoE frame length of the received RoE frames is equal to the RoE frame length of the transmitted RoE frames for a predetermined number of hyper-frames and whether the counter increment value of the received RoE frames is equal to the counter increment value of the transmitted RoE frames for the predetermined number of hyper-frames.

Based on determining that the RoE frame length of the received RoE frames is equal to the RoE frame length of the transmitted RoE frames for a predetermined number of hyper-frames (e.g., 10) and that the counter increment value of the received RoE frames is equal to the counter increment value of the transmitted RoE frames for the predetermined number of hyper-frames, the negotiation operations are completed for the Proxy Slave and the Proxy Slave transitions to the Operational State (e.g., Operational State 406), as shown at 510. However, based on determining that the RoE frame length of the received RoE frames is not equal to the RoE frame length of the transmitted RoE frames or that the counter increment value of the received RoE frames is not equal to the counter increment value of the transmitted RoE frames, the Proxy Slave continues, as shown at 512, to receive, identify, and check the frame lengths and counter increment values for additional RoE frames.

Figure 6:
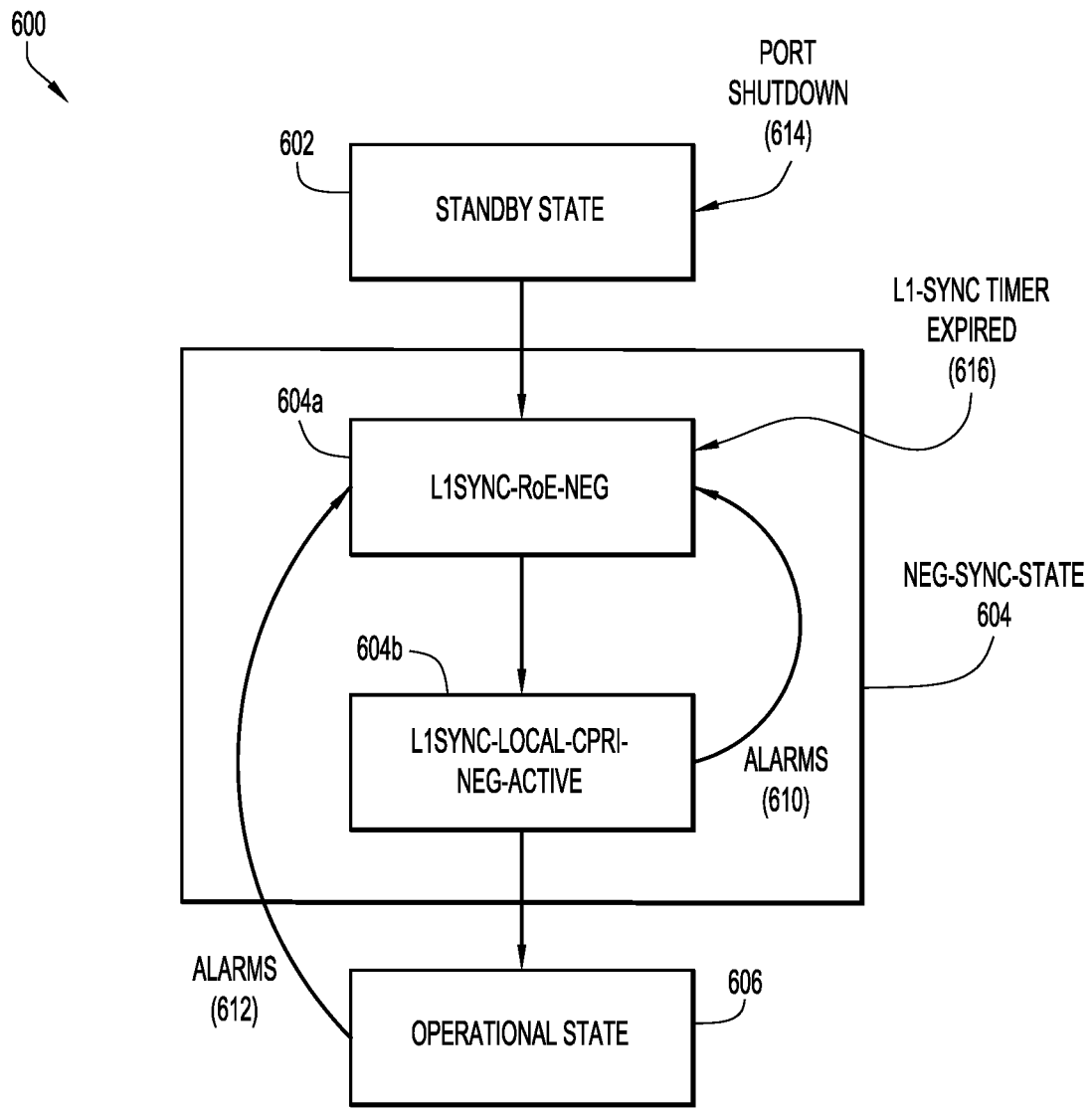
FIG. 6 is a block diagram illustrating a configuration of the proxy node state machine of FIG. 2 as configured for a Proxy Master node in an Ethernet-based fronthaul network via a Proxy Master state machine, according to an example embodiment.

Referring to FIG. 6, FIG. 6 is a block diagram illustrating a configuration of the proxy node state machine of FIG. 2 as configured for a Proxy Master node in an Ethernet-based fronthaul network (e.g., Proxy Master node 106 in Ethernet-based fronthaul network 100) via a Proxy Master state machine 600, according to an example embodiment. In at least one embodiment, the Proxy Master state machine 600 may include a Standby state 602, a Neg-Sync-State 604, and an Operational state 606. For the embodiment of FIG. 6, the Neg-Sync-State 604 may include a Layer 1 Synchronization RoE Negotiation (L1Sync-RoE-Neg) sub-state 604a and may also include a Layer 1 Synchronization Local CPRI Negotiations Active (L1Sync-Local-CPRI-Neg-Active) sub-state 604b.

In the Standby state 602, the Proxy Master node does not transmit or receive a CPRI bit stream or RoE frames but instead awaits configuration to start various CPRI and RoE functions/operations. In at least one embodiment, a CPRI link bit rate list (e.g., including at least 4 link bit rates) may be configured by for the Proxy Master node (e.g., manually by a user/operator and/or automatically via a script, etc.) as start-up configuration for the Proxy Master node while in the Standby state 602. In addition, a corresponding role of being a Proxy Master node may also be configured for the Proxy Master node in the Standby state 602.

Upon successful configuration of the Proxy Master node in the Standby state 602, the Proxy Master node transitions to the Neg-Sync-State 604 of the Master state machine and, in particular, transitions to the L1Sync-RoE-Neg sub-state 604a of the Neg-Sync-State 404.

In the L1Sync-RoE-Neg sub-state 604a, the Proxy Master waits for receiving the RoE frames from the Proxy Slave. Once the Proxy Master starts receiving the RoE frames from the Proxy Slave, it starts performing various RoE frame validation operations by monitoring the RoE frame length and p/q-counter values from the RoE headers of the RoE frames. If these values are consistent for at least 10 complete hyper-frames, the Proxy Master transitions to the L1Sync-Local-CPRI-Neg-Active sub-state 604b.

In the L1Sync-Local-CPRI-Neg-Active sub-state 604b, the Proxy Master, since it is already receiving RoE frames from the Proxy Slave consistently, starts de-mapping the RoE frames and playing out the CPRI bit stream towards the CPRI endpoint (e.g., the RE) after de-mapping CPRI bit stream from the RoE frames.

The Proxy Master plays out the CPRI stream using a link bit rate as may be derived from the RoE frame length and p/q-counter values from the RoE header of the RoE frames received from the Proxy Slave in some embodiments. For example, consider that a particular link bit rate of 614.4 Megabit per second (Mbits/s) is currently being used for the CPRI bit stream mapped into RoE frames by the Proxy Slave and transmitted to the Proxy Master. Such RoE frames may have a particular RoE frame length and p/q-counter increment values based on the same number of bytes being included in each RoE frame transmitted by the Proxy Slave/received by the Proxy Master for the particular link bit rate of 614.4 Mbits/s. By identifying the RoE frame length and p/q-counter increment values for each received RoE frame, the Proxy Master may identify the particular link bit rate associated with the CPRI bit stream mapped into the RoE frames. In one embodiment, a table or the like may be configured for a Proxy Master (e.g., during the Standby state 602 operations, in which the table includes a mapping of various link bit rates to corresponding RoE frame length and p/q-counter increment values.

In still some embodiments, link bit rate information may be included in RoE frames by including bit rate information within any combination of RoE extension headers, which may be inserted in RoE frames between the RoE header and RoE payload of RoE frames, and/or by using an Experimental subType in the RoE header of RoE frames to indicate the bit rate. Other variations can be envisioned.

The Proxy Master continues to play out the CPRI bit stream towards the RE as long as it is receiving the RoE frames corresponding to a same link rate as indicated by the RoE frame length and p/q counter values (e.g., the Proxy Master acts as a REC proxy for the RE).

At some point, the RE will achieve HFNSYNC (e.g., K-byte alignment) after receiving the CPRI stream from the Proxy Master (e.g., the RE receive link rate and the link rate used in the transmissions by the Proxy Master are matching). Upon the RE achieving HFNSYNC for the Proxy Master transmitted CPRI bit stream, the RE will also start playing out a CPRI stream using the same link bit rate towards the Proxy Master. The Proxy Master will also start receiving this CPRI bit stream transmitted by the RE and will try to achieve a HFNSYNC with this received CPRI bit stream.

For the CPRI bit stream transmission coming from the RE, the Proxy Master node will wait for achieving HFN-SYNC for an 'N' number of hyper-frames and any CPRI fault observed before this HFNSYNC may not applicable and may be ignored. Stated differently, the Proxy Master may waits for N hyper-frames to achieve HFNSYNC and declare failure in achieving HFNSYNC with RE after the expiry of these N hyper-frames. The number N may be configured depending on the hardware clocking logic capability of the Proxy Master. In at least one embodiment, a value higher than 10 hyper-frames may be used.

Once the Proxy Master achieves the HFNSYNC (K-byte alignment) as per the CPRI v7.0 Specification, all the nodes: the REC, Proxy Master, Proxy Slave, and the RE can be considered to be using the same CPRI link bit rate for transmit and receive and all the nodes are considered to be frame and byte synchronized.

On achieving HFNSYNC with the RE transmission, the Proxy Master starts mapping this received CPRI bit stream into RoE frames, transmitting the RoE frames the towards the other end (e.g., towards the REC) of the Ethernet-based fronthaul network, and transitions to the Operational state 406.

In the L1Sync-Local-CPRI-Neg-Active sub-state 604b, if any RoE alarm is detected in the RoE frames received from the Proxy Slave as shown at 610, the Proxy Master will trigger restart of the CPRI L1 synchronization operations and transition back to the L1Sync-RoE-Neg sub-state 604a of the Proxy Master state machine 600. The L1-sync top level timer will also be restarted on making this state transition.

In the Operational state 606, the Proxy Master continues to map the received CPRI bit stream (received from the RE) into RoE frames and transmit the RoE frames towards the Proxy Slave.

Additionally for the Operational state 606, the Proxy Master may also monitor whether the RoE frame length and p/q-counter increments values in the transmitted RoE frames may continue to match with the values as received in the RoE flow coming from the Proxy Slave. On detecting a persistent change in the RoE frame length and p/q-counter increments values in the RoE frames received from the Proxy Slave, an alarm may be raised by the Proxy Master as shown at 612, and the Proxy Master transitions back to the L1Sync-RoE-Neg sub-state 604a after re-starting the top level L1-sync timer and restarts the CPRI-RoE operations. As long as the RoE frame length and p/q-counter increments values are matching in both the directions, the CPRI-RoE flow is considered to be up and operational from the Proxy Master's perspective.

Further for the Operational state 606, in case any CPRI alarm (LOS/LOF/RAI) is detected by the Proxy Master also shown at 612, the Proxy Master transitions to the back to the L1Sync-RoE-Neg sub-state 604a and restarts the CPRI-RoE operations. Similarly, if the Proxy Master receives a CPRI alarm in any RoE frames received from the Proxy Slave (e.g., due to the Proxy Slave detecting a CPRI alarm on its CPRI link with REC), the Proxy Master transitions back to the L1Sync-RoE-Neg sub-state 604a and restarts the CPRI-RoE operations. While or upon moving to the L1Sync-RoE-Neg sub-state 604a, the L1-sync top level timer is also restarted. In the event of a port shutdown as shown at 614, the Proxy Master may revert back to the Standby state 602 and await configuration, as discussed herein. In the event of a timeout of the L1-sync timer as shown at 616, the Proxy Master may transition back to the L1Sync-RoE-Neg sub-state 604a and restarts the CPRI-RoE operations after restarting the L1-sync timer.

Figure 7:
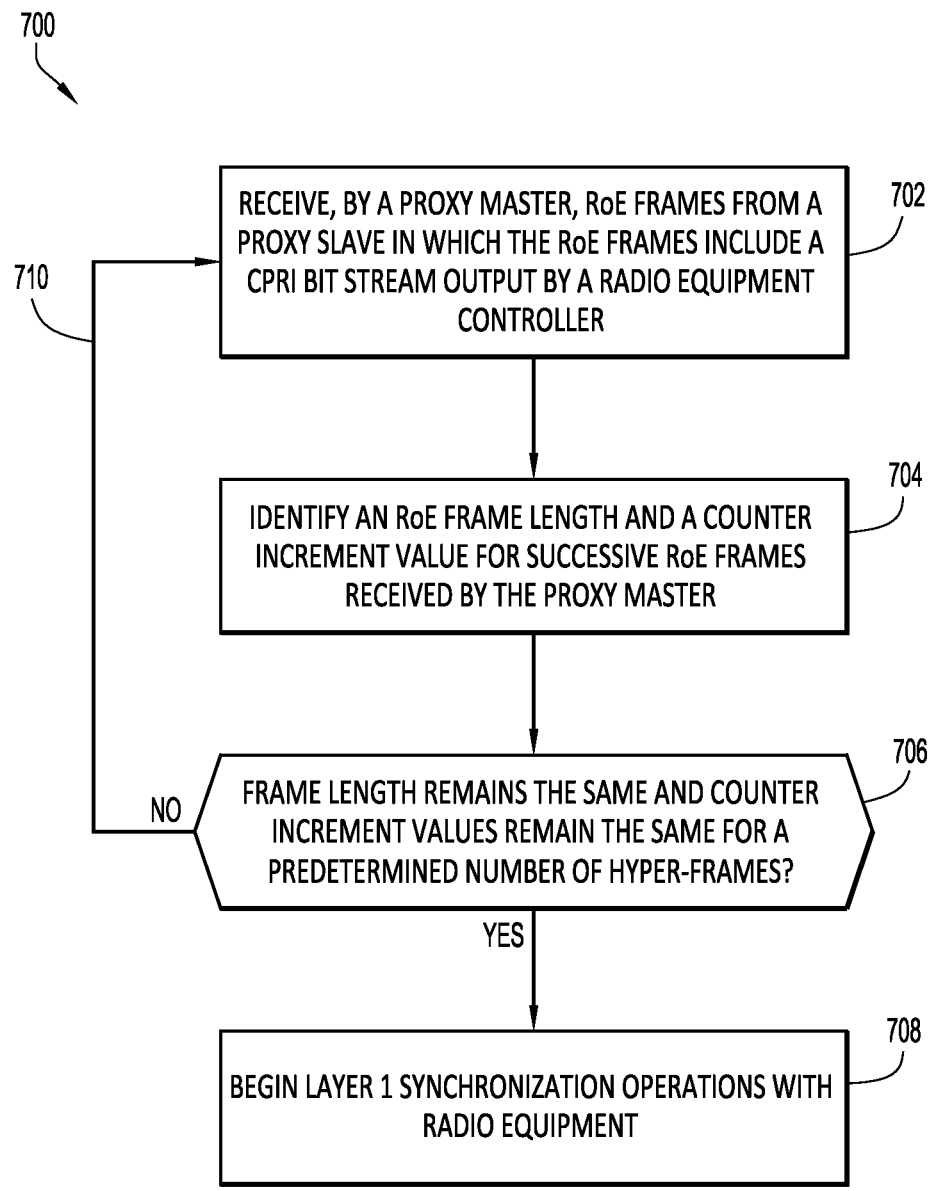
FIG. 7 is another flow chart depicting another method according to an example embodiment.

Referring to FIG. 7, FIG. 7 is a flow chart depicting another method 700 according to an example embodiment. In at least one embodiment, operations associated with method 700 may be associated with RoE validation operations that may be performed by a Proxy Master in an Ethernet-based fronthaul network (e.g., Proxy Master 106 in Ethernet-Based fronthaul network 100).

At 702, the method may include receiving, by the Proxy Master, RoE frames from a Proxy Slave in which received RoE frames include a CPRI bit stream output by a radio equipment controller. At 704, the Proxy Master identifies a RoE frame length and a counter increment value (e.g., p/q-counter increment value) for successive received RoE frames. At 706, the Proxy Master determines whether the RoE frame length remains the same for a predetermined number of hyper-frames and that the counter increment value remains the same for the predetermined number of hyper-frames.

Based on determining that the RoE frame length remains the same for a predetermined number (e.g., 10) of hyper-frames and that the counter increment value remains the same for the predetermined number of hyper-frames, the Proxy Master begins Layer 1 synchronization operations with the radio equipment (e.g., transitions to the L1Sync-Local-CPRI-Neg-Active sub-state), as shown at 708. However, based on determining that the RoE frame length does not remain the same for the predetermined number of hyper-frames or that the counter increment value does not remain the same for the predetermined number of hyper-frames, the Proxy Master continues, as shown at 710, to receive, identify, and check the frame lengths and counter increment values for additional successively received RoE frames.

In summary, due to the adoption of massive Multiple Input Multiple Output (MIMO) and huge bandwidth involved in 5G communications, current deployments for Long Term Evolution (LTE), LTE-Advanced, LTE-Advanced Pro and new 5G technologies based deployments are likely to be transitioned to packetized fronthaul based networks.

Existing deployments where CPRI technology is used for interconnection between REC and RE should also work in Ethernet-based packetized fronthaul networks. This is essential for better adoption of 5G in the already existing network deployments. While the IEEE 1914.1 and IEEE 1914.3 specifications are the standards for packet based fronthaul transport networks, these standards do not cover the state machine aspects for these CPRI L1 gateway nodes. Additionally, the CPRI state machine as provided in the CPRI v7.0 Specification is not applicable to the proxy nodes of an Ethernet-based fronthaul network due to the Layer 2 and above protocol negotiations in the CPRI state machine which can take place only between the actual CPRI end points (e.g., REC and RE).

Techniques presented herein provide for the ability to use proxy nodes in an Ethernet-based fronthaul network to achieve the cross product of CPRI and Ethernet to be achieved in order to facilitate end-to-end CPRI flows between the REC and RE. For example, techniques presented herein provide for implementation of detailed state machines, state machine transitions, and a deterministic method to handle key state transition events to address the gaps in the IEEE 1914.3 and CPRI v7.0 Specifications.

Thus, techniques presented herein may provide for the identification of different states applicable for the proxy or L1 gateway nodes in an Ethernet-based fronthaul network, which may include identification of key events for state transitions along with the deterministic method to conclude on key events in the overall Layer 1 synchronization operations. Techniques presented herein further provide for the ability to declare that a RoE-end L1 synchronization has been achieved (e.g., by a Proxy Slave) based on analysis of RoE frame length and p/q-counter increment values in successive RoE frames.

Figure 8:
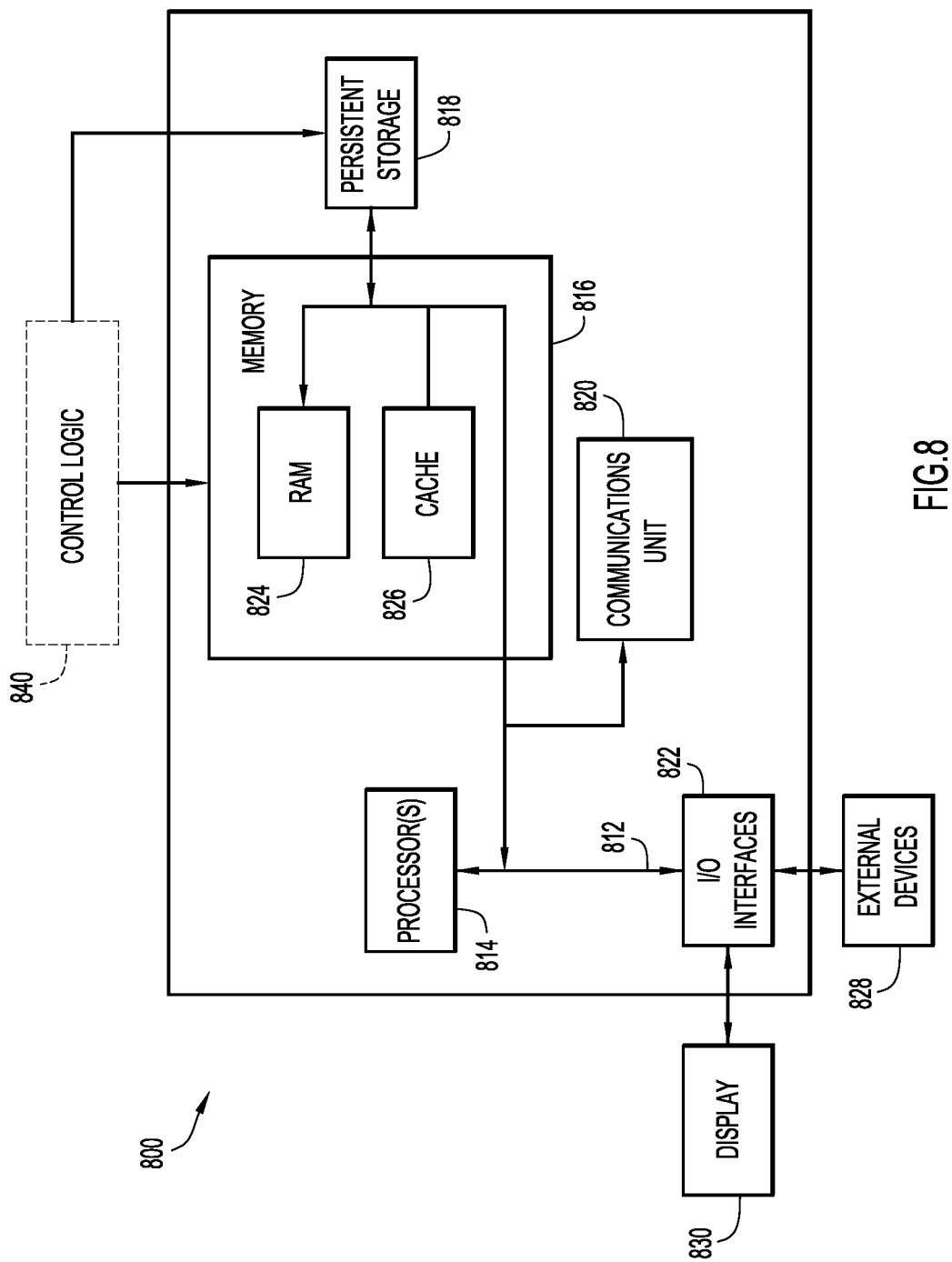
FIG. 8 is a hardware block diagram of a computing device that may perform functions of a proxy node for state machine handling in an Ethernet-based fronthaul network, in connection with the techniques depicted in FIGS. 1-7.

Referring to FIG. 8, FIG. 8 illustrates a hardware block diagram of a computing device 800 that may perform the functions of a proxy node, referred to herein in connection with FIGS. 1-7 (e.g., Proxy Slave 104 or Proxy Master 106). It should be appreciated that FIG. 8 provides only an illustration of one embodiment and does not imply any limitations with regard to the environments in which different embodiments may be implemented. Many modifications to the depicted environment may be made.

As depicted, the computing device 800 includes a bus 812, which provides communications between computer (e.g., hardware) processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media, which can be inclusive on non-transitory computer readable storage media. In the depicted embodiment, memory 816 which may be inclusive of one or more memory element(s), may include random access memory (RAM) 824 and cache memory 826. In general, memory 816 can include any suitable volatile or non-volatile computer readable storage media. Instructions for control logic 840 may be stored in memory 816 and/or persistent storage 818 for execution by processor(s) 614. When the processor(s) 814 execute control logic 840, the processor(s) 814 are caused to perform the operations described above in connection with FIGS. 1-7.

One or more programs and/or other logic may be stored in persistent storage 818 for execution by one or more of the respective computer processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices using, for example, one or more CPRI port(s)/interfaces and Ethernet port(s)/interface(s). Communications unit 820 may provide communications through the use of either or both physical and wireless communications links.

I/O interface(s) 822 allows for input and output of data with other devices that may be connected to computing device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

In one form, a computer-implemented method is provided and may include performing, by a proxy node of a fronthaul network, negotiation operations associated with establishing a Common Public Radio Interface (CPRI) communication link between radio devices of the fronthaul network, wherein the negotiation operations comprise Layer 1 synchronization operations and Radio over Ethernet (RoE) validation operations for one or more link bit rates; and facilitating communications between the radio devices at a matching link bit rate upon completion of the negotiation operations.

In at least one embodiment, the method may include detecting one or more errors during the negotiation operations or while facilitating the communications between the radio devices; and re-starting the negotiation operations based on the one or more errors. In at least one embodiment, the one or more errors may include at least one of: a loss of synchronization alarm; a loss of frame alarm; a remote alarm indication; a RoE fault determined based on RoE frames transmitted and/or received by the proxy node; and a timeout of a Layer 1 synchronization timer. In at least one embodiment, the one or more errors may include at least one of: one or more errors detected by the proxy node; and one or more errors indicated in RoE frames received by the proxy node.

In at least one embodiment, the RoE validation operations performed by the proxy node may include: determining consistency in RoE frame length and packet counter increment values for one of: a plurality of RoE frames received by the proxy node; and a plurality of RoE frames both transmitted and received by the proxy node. In at least one embodiment, the Layer 1 synchronization operations performed by the proxy node may include: attempting a hyper-frame number synchronization for a CPRI bit stream output by a first radio device; and upon achieving the hyper-frame number synchronization for the CPRI bit stream at a particular link bit rate in use during the Layer 1 synchronization operations, transmitting the CPRI bit stream toward a second radio device via a plurality of RoE frames, wherein each transmitted RoE frame indicates a frame length and a counter value that is set based on the particular link bit rate.

In at least one embodiment, the proxy node may be a proxy slave node, the first radio device may be a radio equipment controller, and the second radio device may be a radio equipment and wherein the RoE validation operations are performed, at least in part, after the Layer 1 synchronization operations, the RoE validation operations comprising: receiving a plurality of RoE frames from a proxy master node, the plurality of received RoE frames comprising a CPRI bit stream output by the radio equipment; identifying a RoE frame length and a counter increment value for successive transmitted RoE frames transmitted by the proxy slave node; identifying a RoE frame length and a counter increment value for successive RoE frames received by the proxy slave node; determining whether the RoE frame length of the received RoE frames is equal to the RoE frame length of the transmitted RoE frames for a predetermined number of hyper-frames and whether the counter increment value of the received RoE frames is equal to the counter increment value of the transmitted RoE frames for the predetermined number of hyper-frames; and upon determining that the RoE frame length of the received RoE frames is equal to the RoE frame length of the transmitted RoE frames for a predetermined number of hyper-frames and that the counter increment value of the received RoE frames is equal to the counter increment value of the transmitted RoE frames for the predetermined number of hyper-frames, the negotiation operations are completed for the proxy slave node. In at least one embodiment, the predetermined number of hyper-frames is at least 10 hyper-frames.

In at least one embodiment, the proxy node may be a proxy master node, the first radio device may be a radio equipment, and the second radio device may a radio equipment controller and wherein the RoE validation operations are performed, at least in part, before the Layer 1 synchronization operations, the RoE validation operations comprising: receiving a plurality of RoE frames from a proxy slave node, the plurality of received RoE frames comprising a CPRI bit stream output by the radio equipment controller; identifying a RoE frame length and a counter increment value for successive received RoE frames; determining whether the RoE frame length remains the same for a predetermined number of hyper-frames and that the counter increment value remains the same for the predetermined number of hyper-frames; and upon determining that the RoE frame length remains the same for a predetermined number of hyper-frames and that the counter increment value remains the same for the predetermined number of hyper-frames, starting the Layer 1 synchronization operations with the radio equipment.

In at least one embodiment, the Layer 1 synchronization operations for the proxy master node may further comprise: transmitting to the radio equipment the CPRI bit stream output by the radio equipment controller, wherein upon the radio equipment achieving a hyper-frame number synchronization for the CPRI bit stream transmitted by the proxy master node, the radio equipment outputs the CPRI bit stream that is received by the proxy master node for attempting the hyper-frame number synchronization.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). A database system may be included within or coupled to a server and/or client systems. The database systems and/or storage structures may be remote from or local to the computer or other processing systems, and may store any desired data (e.g., resource record data).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   performing, by a proxy node of a fronthaul network, negotiation operations associated with establishing a Common Public Radio Interface (CPRI) communication link between radio devices of the fronthaul network, wherein the negotiation operations comprise Layer 1 synchronization operations and Radio over Ethernet (RoE) validation operations for one or more link bit rates and the RoE validation operations comprise determining whether one of:
   RoE frame length remains the same and packet counter increment values remain the same for a plurality of RoE frames obtained by the proxy node for a predetermined number of hyper-frames; or
   RoE frame length is equal for a plurality of RoE frames obtained by the proxy node and a plurality of RoE frames transmitted by the proxy node for a predetermined number of hyper-frames and packet counter increment values are equal for the plurality of RoE frames obtained by the proxy node and the plurality of RoE frames transmitted by the proxy node for the predetermined number of hyper-frames;
   facilitating communications between the radio devices at a matching link bit rate upon completion of the negotiation operations; and
   re-starting the negotiation operations based on an occurrence of one or more alarms while facilitating the communications between the radio devices.

2. The method of claim 1, further comprising:
   re-starting the negotiation operations based on an occurrence of one or more errors during the negotiation operations.

3. The method of claim 2, wherein the one or more errors include at least one of:
   a loss of synchronization alarm;
   a loss of frame alarm;
   a remote alarm indication;
   a RoE fault determined based on RoE frames transmitted and/or received by the proxy node; and
   a timeout of a Layer 1 synchronization timer.

4. The method of claim 2, wherein the one or more errors include at least one of:
   one or more errors detected by the proxy node; and
   one or more errors indicated in RoE frames received by the proxy node.

5. The method of claim 1, wherein the predetermined number of hyper-frames is at least 10 hyper-frames.

6. The method of claim 1, wherein the Layer 1 synchronization operations performed by the proxy node comprise:
   attempting a hyper-frame number synchronization for a CPRI bit stream output by a first radio device; and
   upon achieving the hyper-frame number synchronization for the CPRI bit stream at a particular link bit rate in use during the Layer 1 synchronization operations, transmitting the CPRI bit stream toward a second radio device via a plurality of RoE frames, wherein each transmitted RoE frame indicates a frame length and a counter value that is set based on the particular link bit rate.

7. The method of claim 6, wherein the proxy node is a proxy slave node, the first radio device is a radio equipment controller, and the second radio device is a radio equipment and wherein the RoE validation operations are performed, at least in part, after the Layer 1 synchronization operations, the RoE validation operations comprising:
   obtaining a plurality of received RoE frames from a proxy master node, the plurality of received RoE frames comprising a CPRI bit stream output by the radio equipment;
   identifying a RoE frame length and a counter increment value for successive transmitted RoE frames transmitted by the proxy slave node;
   identifying a RoE frame length and a counter increment value for successive received RoE frames obtained by the proxy slave node;
   determining whether the RoE frame length of the successive received RoE frames is equal to the RoE frame length of the successive transmitted RoE frames for a predetermined number of hyper-frames and whether the counter increment value of the successive received RoE frames is equal to the counter increment value of the successive transmitted RoE frames for the predetermined number of hyper-frames; and
   upon determining that the RoE frame length of the successive received RoE frames is equal to the RoE frame length of the successive transmitted RoE frames for a predetermined number of hyper-frames and that the counter increment value of the successive received RoE frames is equal to the counter increment value of the successive transmitted RoE frames for the predetermined number of hyper-frames, the negotiation operations are completed for the proxy slave node.

8. The method of claim 7, wherein the predetermined number of hyper-frames is at least 10 hyper-frames.

9. The method of claim 6, wherein the proxy node is a proxy master node, the first radio device is a radio equipment, and the second radio device is a radio equipment controller and wherein the RoE validation operations are performed, at least in part, before the Layer 1 synchronization operations, the RoE validation operations comprising:

obtaining a plurality of RoE frames from a proxy slave node, the plurality of obtained RoE frames comprising a CPRI bit stream output by the radio equipment controller;

identifying a RoE frame length and a counter increment value for successive received RoE frames;

determining whether the RoE frame length remains the same for a predetermined number of hyper-frames and that the counter increment value remains the same for the predetermined number of hyper-frames; and upon determining that the RoE frame length remains the same for a predetermined number of hyper-frames and that the counter increment value remains the same for the predetermined number of hyper-frames, starting the Layer 1 synchronization operations with the radio equipment.

10. The method of claim 9, wherein the Layer 1 synchronization operations for the proxy master node further comprise:

transmitting to the radio equipment the CPRI bit stream output by the radio equipment controller, wherein upon the radio equipment achieving a hyper-frame number synchronization for the CPRI bit stream transmitted by the proxy master node, the radio equipment outputs the CPRI bit stream that is received by the proxy master node for attempting the hyper-frame number synchronization.

11. One or more non-transitory computer readable storage media encoded with instructions that, when executed by a processor, cause the processor to perform operations, comprising:

performing, by a proxy node of a fronthaul network, negotiation operations associated with establishing a Common Public Radio Interface (CPRI) communication link between radio devices of the fronthaul network, wherein the negotiation operations comprise Layer 1 synchronization operations and Radio over Ethernet (RoE) validation operations for one or more link bit rates and the RoE validation operations comprise determining whether one of:

RoE frame length remains the same and packet counter increment values remain the same for a plurality of RoE frames obtained by the proxy node for a predetermined number of hyper-frames; or RoE frame length is equal for a plurality of RoE frames obtained by the proxy node and a plurality of RoE frames transmitted by the proxy node for a predetermined number of hyper-frames and packet counter increment values are equal for the plurality of RoE frames obtained by the proxy node and the plurality of RoE frames transmitted by the proxy node for the predetermined number of hyper-frames;

facilitating communications between the radio devices at a matching link bit rate upon completion of the negotiation operations; and re-starting the negotiation operations based on an occurrence of one or more alarms while facilitating the communications between the radio devices.

12. The media of claim 11, further comprising instructions that, when executed by the processor, cause the processor to perform further operations, comprising:

re-starting the negotiation operations based on an occurrence of one or more errors during the negotiation operations.

13. The media of claim 12, wherein the one or more errors include at least one of:
a loss of synchronization alarm;
a loss of frame alarm;
a remote alarm indication;
a RoE fault determined based on RoE frames transmitted and/or received by the proxy node; and
a timeout of a Layer 1 synchronization timer.

14. The media of claim 12, wherein the one or more errors include at least one of:
one or more errors detected by the proxy node; and
one or more errors indicated in RoE frames received by the proxy node.

15. The media of claim 11, wherein the predetermined number of hyper-frames is at least 10 hyper-frames.

16. The media of claim 11, wherein the Layer 1 synchronization operations performed by the proxy node comprise:
attempting a hyper-frame number synchronization for a CPRI bit stream output by a first radio device; and
upon achieving the hyper-frame number synchronization for the CPRI bit stream at a particular link bit rate in use during the Layer 1 synchronization operations, transmitting the CPRI bit stream toward a second radio device via a plurality of RoE frames, wherein each transmitted RoE frame indicates a frame length and a counter value that is set based on the particular link bit rate.

17. A proxy node comprising:
at least one memory element for storing data; and
at least one processor for executing instructions associated with the data, wherein executing the instructions causes the proxy node to perform operations, comprising:
performing, by the proxy node of a fronthaul network, negotiation operations associated with establishing a Common Public Radio Interface (CPRI) communication link between radio devices of the fronthaul network, wherein the negotiation operations comprise Layer 1 synchronization operations and Radio over Ethernet (RoE) validation operations for one or more link bit rates and the RoE validation operations comprise determining whether one of:
RoE frame length remains the same and packet counter increment values remain the same for a plurality of RoE frames obtained by the proxy node for a predetermined number of hyper-frames; or
RoE frame length is equal for a plurality of RoE frames obtained by the proxy node and a plurality of RoE frames transmitted by the proxy node for a predetermined number of hyper-frames and packet counter increment values are equal for the plurality of RoE frames obtained by the proxy node and the plurality of RoE frames transmitted by the proxy node for the predetermined number of hyper-frames;
facilitating communications between the radio devices at a matching link bit rate upon completion of the negotiation operations; and
re-starting the negotiation operations based on an occurrence of one or more alarms while facilitating the communications between the radio devices.

18. The proxy node of claim 17, wherein executing the instructions causes the proxy node to perform further operations, comprising:
re-starting the negotiation operations based on an occurrence of one or more errors during the negotiation operations.

19. The proxy node of claim 18, wherein the one or more errors include at least one of:
a loss of synchronization alarm;
a loss of frame alarm;
a remote alarm indication;

a RoE fault determined based on RoE frames transmitted and/or received by the proxy node; and a timeout of a Layer 1 synchronization timer.

20. The proxy node of claim 18, wherein the one or more errors include at least one of:

one or more errors detected by the proxy node; and one or more errors indicated in RoE frames received by the proxy node.

* * * * *